(12) United States Patent
Fuseya et al.

(10) Patent No.: US 6,961,991 B2
(45) Date of Patent: Nov. 8, 2005

(54) METHOD OF MAKING AN INDUCTOR COIL UNIT INCLUDING STEPS OF POURING RESIN BETWEEN FRAMES

(75) Inventors: Atsushi Fuseya, Ibaraki (JP); Hajime Sekiguchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 10/150,152

(22) Filed: May 20, 2002

(65) Prior Publication Data
US 2002/0175795 A1 Nov. 28, 2002

(30) Foreign Application Priority Data

May 22, 2001 (JP) ........................................ 2001-152190
May 10, 2002 (JP) ........................................ 2002-135484

(51) Int. Cl.$^7$ .............................................. H01F 7/06
(52) U.S. Cl. ......................... 29/602.1; 29/606; 29/611; 336/206; 219/671
(58) Field of Search ....................... 29/611, 612, 602.1, 29/605, 608, 606, 596, 598; 219/671–677; 336/90, 192, 198, 208

(56) References Cited

U.S. PATENT DOCUMENTS

| | | | | |
|---|---|---|---|---|
| 4,098,631 A | | 7/1978 | Stryjewski | ................. 156/221 |
| 6,137,390 A | * | 10/2000 | Tung et al. | ................. 336/83 |
| 6,275,132 B1 | * | 8/2001 | Shikama et al. | ........... 29/602.1 |
| 6,311,387 B1 | * | 11/2001 | Shikama et al. | ........... 29/602.1 |
| 6,377,152 B1 | * | 4/2002 | Shikama et al. | ............. 336/83 |
| 6,590,487 B2 | * | 7/2003 | Uchiyama | ................. 29/602.1 |
| 2002/0175795 A1 | * | 11/2002 | Fuseya et al. | ................. 336/90 |

FOREIGN PATENT DOCUMENTS

| | | | |
|---|---|---|---|
| CN | 1217553 | 5/1999 | |
| JP | 61222210 | * 10/1986 | ................. 336/180 |
| JP | 5-49201 | 2/1993 | |
| JP | 7-142278 | 6/1995 | |
| JP | 8-72099 | 3/1996 | |
| JP | 2000-81806 | 3/2000 | |
| JP | 2000-173759 | 6/2000 | |

OTHER PUBLICATIONS

Official Action/Search Report (The Patent Office of the People's Republic of China).

* cited by examiner

*Primary Examiner*—Minh Trinh
(74) *Attorney, Agent, or Firm*—Fitzpatrick, Cella, Harper & Scinto

(57) ABSTRACT

A method of manufacturing a coil unit includes the first step of disposing a coil between a first frame and a second frame, the second step of pouring liquid resin into between the first frame and the second frame with the coil disposed therebetween, and the third step of curing the liquid resin to thereby fix the first frame, the second frame and the coil to one another.

14 Claims, 14 Drawing Sheets

METHOD OF MAKING AN INDUCTOR COIL UNIT INCLUDING STEPS OF POURING RESIN BETWEEN FRAMES

BACKGROUND OF THE INVENTION

1. Field of the Invention

The invention relates to an electromagnetic induction coil unit for use in a heating apparatus of the electromagnetic induction heating type for heating a material to be heated by the heat generation of an electromagnetic induction heat generative member, and a method of manufacturing the same.

Here, the heating apparatus using the electromagnetic induction coil unit of the present invention can be widely utilized not only as an image heating and fixing apparatus like an embodiment as will be described later, but also as a heating apparatus for a material to be heated, such as an image heating apparatus for heating a recording material bearing an image thereon to thereby improve the surface property (such as glossing), an image heating apparatus for provisionally heating an image, or a heating apparatus for executing heat press, drying process, laminating process, etc. while conveying a sheet-like material.

2. Description of Related Art

For example, an image forming apparatus using the electrophotographic process is usually provided with a fixing device as an image heating apparatus for fusion-bonding a toner image on a recording material such as transfer paper. A conventional fixing device is comprised of heating means for heating and fusion-bonding a toner image, and pressurizing means for nipping and conveying the recording material while pressing it.

Also, the heating means has generally been provided with a halogen lamp as a heater in a heating roller, and has heated the heating roller by the lamp and has raised the temperature thereof to a temperature necessary for fixing.

In such a fixing device, a method of generating an eddy current in an electrically conducting layer provided on the surface of a fixing roller by a magnetic flux by an electromagnetic induction coil, and causing the fixing roller to generate heat by Joule heat has been proposed as means for heating (Japanese Patent Application Laid-Open No. 2000-081806). This method enables a heat generating source to be placed very close to a toner image and therefore, as compared with the conventional heat roller type using the halogen lamp, it has the feature that the time required until at the starting of the fixing device, the temperature of the surface of the fixing roller reaches a temperature suitable for fixing can be shortened.

As the general construction of the heat roller in the fixing device of the electromagnetic induction heating type, there is known one provided with a bobbin having an electromagnetic induction coil spirally wound in a heat roller comprising a metal conductor (Japanese Patent Application Laid-Open No. 2000-173759).

While a material excellent in electrical conductivity is used as the material of the electromagnetic induction coil, heat generation may sometimes become great even in a highly electrically conductive material by a heavy current of a high frequency.

Further, the heating efficiency of the fixing roller has sometimes become bad when the electromagnetic induction coil is overheated. Therefore, it is necessary to efficiently discharge the overheat of the induction coil to the outside, but there has been the problem that the bobbin on which the electromagnetic induction coil is wound is liable to be fitted with heat.

Accordingly, a construction in which the bobbin on which the coil is wound is eliminated so that the cooling effect for the electromagnetic induction coil may become high, and the overheat of the electromagnetic induction coil is efficiently discharged to the outside. As a bobbinless coil, there is known a molded coil resin-enveloped by molding (Japanese Patent Application Laid-Open No. 05-049201), and the entire electromagnetic induction coil is covered with resin of good heat conductivity to thereby enhance the radiating property of the coil.

In a manufacturing method therefore, however, there is the problem that during formation, the coil is deformed or moved by the injection pressure and flowing of the molded resin.

Heretofore, a method of manufacturing an insert article such as a molded coil has been carried out by the use of a metal mold having a pin for holding the insert article, as shown in FIG. 19 of the accompanying drawings (Japanese Patent Application Laid-Open No. 08-072099).

Describing the specification of this metal mold, a metal mold space (cavity) 24 is formed between a closed fixed side metal mold 15 and a movable side metal mold 16, and a holding pin 26 for holding an insert part 21 at a predetermined location in the metal mold space 24 has one end thereof fixed to a plate 25 and the other end thereof inserted for forward and backward movement in a through-hole formed in the metal mold. A rod 22 and an actuator 23 are installed to effect the control of the forward and backward movement of this holding pin 26.

Describing a manufacturing method in this case, the following procedures are repeated.

1. The metal molds 15 and 16 are placed in their opened state and the holding pin 26 is moved forward to a predetermined position.

2. The insert part 21 is held by the holding pin 26 stopped at the predetermined position.

3. The metal molds 15 and 16 are closed.

4. Molten resin is poured into the metal mold space 24 through a runner and a gate.

5. The holding pin 26 is moved backward to a predetermined position.

6. Molten resin is further poured, and molten resin is also poured into a clearance portion formed by the backward movement of the holding pin 26.

7. The molten resin poured into the metal mold space 24 is cooled and solidified.

8. The metal molds 15 and 16 are opened.

9. The molded article of the insert part 21 is taken out of the metal mold.

However, in the case of an insert part of large dimension (an elliptical coil greatly differing in the aspect ratio) like an electromagnetic induction coil which is the basic construction of an electromagnetic induction coil unit to which the present invention is directed, to completely fix it in the metal mold space 24, it is necessary to use considerably many holding pins 26, and the structure of the metal mold becomes complicated.

Also, one of the purposes of resin-enveloping the electromagnetic induction coil is to secure the thickness of the resin molded portion equal to or greater than a required value (determined by the electrical safety standard) in order to ensure electrical safety (electrical insulation).

However, when the holding by the holding pin 26 of the electromagnetic induction coil which is an insert part is insufficient, the thickness of the formed resin molded portion becomes non-uniform due to the deformation and movement of the electromagnetic induction coil, and this also leads to the problem that the thickness cannot be ensured.

Further, for the purpose of improving electrical safety, it is required that the electromagnetic induction coil be hermetically sealed by resin.

However, if the timing for backwardly moving the holding pin 26 from the metal mold space 24 is bad, a cooled and solidified layer will be formed on the resin around the holding pin, and this leads to the problem that the resin having flowed from around the holding pin into a pin hole is not completely fused but the hole remains and a resin molded portion which has completely enveloped the coil cannot be formed.

On the other hand, in a method of manufacturing an electromagnetic induction coil unit of the resin-enveloped type, in order to lead the lead wire of the electromagnetic induction coil out of an enveloping molded portion, provision is made of such a mechanism as will cause the lead wire to be held by a metal mold, and the covering material of the lead wire is compressed and held during the mold fastening of the metal mold to thereby prevent the leakage of resin from the lead wire portion (Japanese Patent Application Laid-Open No. 07-142278).

However, when a coil holder, an electromagnetic induction coil and a coil holding-down member are used as basic constituents and the electromagnetic induction coil is enveloped by insulating resin, it has been difficult to obtain a good bonded state in the joint surface between the coil holder and a shape formed by envelope molding (hereinafter referred to as the envelope-molded member) and the joint surface between the coil holding-down member and the envelope-molded member.

Also, when an article low in rigidity like the electromagnetic induction coil is envelope-molded, the coil is compressed by the pressure of enveloping resin, but exfoliation from the joint surface occurs due to the reaction force (spring-back) thereof or exfoliation occurs on the joint surface due to the thermal impact by the temperature rise during use, and this leads to the problem that insulativeness is spoiled when the coil is used for a long time under a high-temperature and high-humidity environment.

In the manufacturing method for the electromagnetic induction coil unit, the metal mold is provided with such a mechanism as will compress and hold the lead wire of the electromagnetic induction coil to lead the lead wire out of the envelope-molded portion to thereby prevent the leakage of resin from the lead wire portion, but there is the problem that if the adjustment of the amount of compression of the covering material thereof and the accuracy of the metal mold are bad, the covering material of the lead wire will be greatly spoiled and the breaking of the lead wire or the leakage of resin will occur.

SUMMARY OF THE INVENTION

It is an object of the present invention to provide an electromagnetic induction coil unit of the resin-enveloped type which is a heating apparatus of the electromagnetic induction heating type for heating a material to be heated by the heat generation of an electromagnetic induction heat-generative member and which is free of the deformation and positional movement deviation of an electromagnetic induction coil therein and which is excellent in insulativeness as an electromagnetic induction coil unit and which is so high in reliability as not to cause such inconvenience as the damage, breaking or the like of the cover of the lead wire of the coil.

Another object of the present invention is to provide a method of manufacturing a coil unit comprising the first step of disposing a coil between a first frame and a second frame, the second step of pouring liquid resin into between the first frame and the second frame with the coil disposed therebetween, and the third step of curing the liquid resin to thereby fix the first frame, the second frame and the coil to one another.

Still another object of the present invention is to provide a coil unit comprising a wire-winding coil, a first supporting member for supporting one surface side of the coil, a second supporting member for supporting the other surface side of the coil, and resin poured in its liquid state into between the first and second supporting members, and thereafter cured to fix the coil to the first and second supporting members.

Yet still another object of the present invention is to provide a fixing device comprising a wire-winding coil, a first supporting member for supporting one surface side of the coil, a second supporting member for supporting the other surface side of the coil, resin poured in its liquid state into between the first and second supporting members, and thereafter cured to fix the coil to the first and second support members, an electrically conductive heating medium having a coil unit, and a pressure member for pressurizing the heating medium.

A further object of the present invention is to provide a coil unit comprising a wire-winding coil, a first supporting member for supporting one surface side of the coil, a second supporting member for supporting the other surface side of the coil, and resin poured in its liquid state into between the first and second supporting members, and thereafter cured to fix the coil to the first and second supporting members, the thickness of a portion of the first or second supporting member being smaller than the thickness of the other portion thereof.

Further objects of the present invention will become apparent from the following description.

DETAILED DESCRIPTION OF THE PREFERRED EMBODIMENTS

A fixing device and an image forming apparatus according to the present invention will hereinafter be described in greater detail with reference to the drawings.

(1) Example of the Image Forming Apparatus

Figure 1:
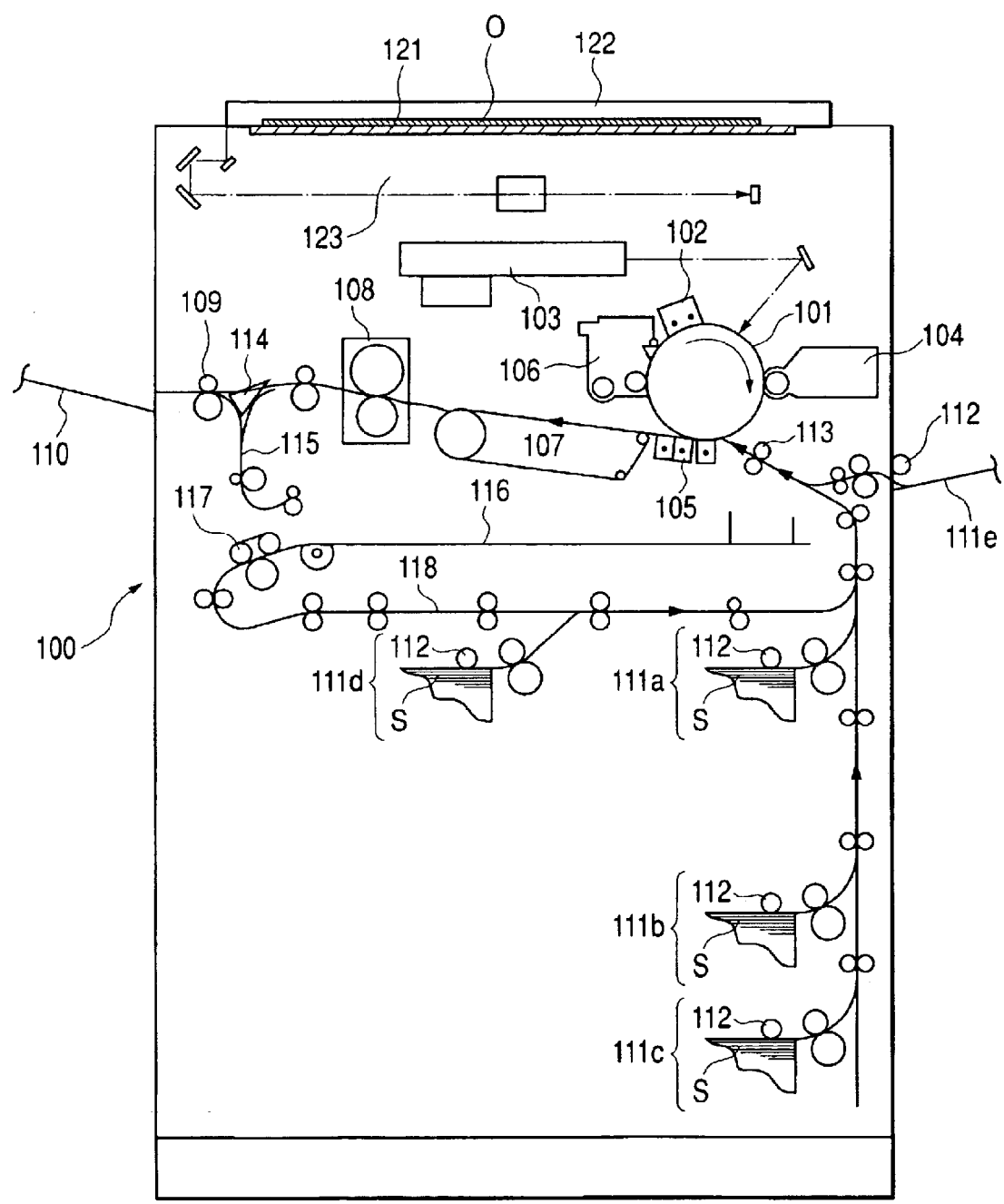
FIG. 1 is a model view schematically showing the construction of an example of an image forming apparatus.

FIG. 1 is a model view schematically showing the construction of an example of the image forming apparatus. The image forming apparatus 100 of this example is a laser beam printer utilizing the transfer type electrophotographic process. This printer itself is known and the description thereof will be kept simple.

The reference numeral 121 designates an original glass stand on which an original O is placed on the basis of a predetermined placement standard with its image surface to be printed facing downwardly, and is set with an original pressure plate 122 covering it. The downwardly facing image surface of this set original is photoelectrically read by the operation of an image reading portion 123.

The reference numeral 101 denotes an electrophotographic photosensitive drum rotatively driven at a predetermined peripheral speed in the clockwise direction indicated by the arrow, and it is uniformly charged to a predetermined polarity and potential by a charger 102, and the charged surface thereof is subjected to laser scanning exposure by an image writing portion (laser scanner) 103, whereby it is subjected to the formation of an electrostatic latent image corresponding to a laser scanning exposure pattern.

The image writing portion 103 outputs a modulated laser beam corresponding to image data by a command from a controller (not shown) based on the image data read by the image reading portion 123 or based on the input image data from an external apparatus and scans and exposes the surface of the photosensitive drum.

The electrostatic latent image formed on the surface of the photosensitive drum 101 is developed as a toner image by a developing device 104, and in a transferring portion which is the opposed portion of the photosensitive drum 101 and a transferring device 105, the toner image is sequentially transferred to a recording material (a transfer material or a sheet of paper) S fed from a paper feeding portion side to the transferring portion at predetermined control timing.

The recording material S which has received the transfer of the toner image in the transferring portion and has been stripped from the surface of the photosensitive drum 101 is conveyed by a conveying device 107 and introduced into a fixing device 108, where it is subjected to the toner image heating and pressurizing fixing process, and is discharged to a paper discharge tray 110 by paper discharging rollers 109. The fixing device 108 is an image heating apparatus of the electromagnetic induction heating type. This fixing device 108 will be described in detail in paragraphs (2) and (3) below.

On the other hand, the surface of the photosensitive drum 1 after the recording material has been stripped therefrom is cleaned by being subjected to the removal of any residual adhering substance such as any untransferred toner by a cleaning device 106, and is repetitively used for image formation.

The reference characters 111a, 111b, 111c and 111d designated first to fourth feed cassette feed portions, and the reference character 111e denotes a manual feed portion. A recording material S is separated and fed from one of these feed portions by a pickup roller 112, and is conveyed along a sheet path to a pair of registration rollers 113, by which the recording material S is fed to the transferring portion at predetermined control timing.

In the case of a two-side print mode, a recording material of which a first side (one side) has been printed and which has left the fixing device 108 has its course changed to a sheet path 115 side by a flapper 114 having had its posture changed over, and is discharged onto and stacked on an intermediate tray 116. The recording material on the intermediate tray 116 is re-fed by a sheet separating and re-feeding mechanism 117 and arrives at the pair of registration rollers 113 through a reversal sheet path 118, and is fed to the transferring portion at predetermined control timing by the pair of registration rollers 113, whereby the transfer of a toner image to a second side of the recording material is done. Thereafter, as in the case of the first side print mode, the recording material is discharged onto the paper discharge tray 110 via the conveying device 107, the fixing device 108 and the paper discharging rollers 109.

(2) Fixing Device 108

Figure 2:
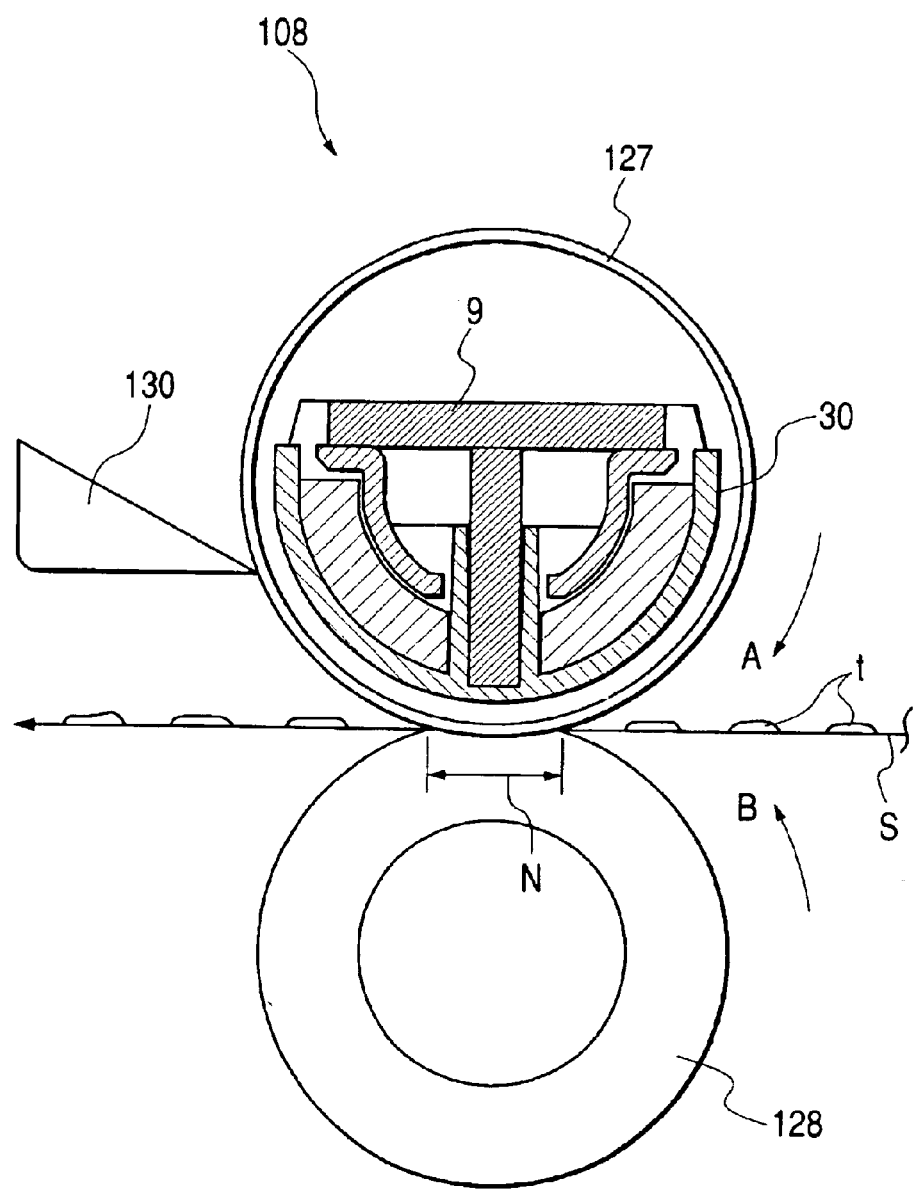
FIG. 2 is an enlarged transverse cross-sectional model view of the essential portions of a fixing device.

FIG. 2 is an enlarged transverse cross-sectional model view of the essential portions of the fixing device 108. The fixing device 108 is a heat roller type image heating apparatus of the electromagnetic induction heating type.

The reference numeral 127 designates a hollow pipe-shaped fixing roller as a heating member comprising a metal conductor (electromagnetic induction heat generative member), and having a toner mold-releasing layer provided on the outer peripheral surface thereof. The fixing roller 127 has its opposite end portions rotatably journalled and disposed between the side plates (not shown) of the apparatus through bearing members.

The reference numeral 128 denotes an elastic pressure roller as a pressure member, and it comprises a silicone rubber layer (heat-resistant elastic layer) provided in a roller shape concentrically around and integrally with a mandrel, and a toner mold-releasing layer provided on the outer peripheral surface of the silicone rubber layer. The opposite end portions of the mandrel are rotatably journalled and disposed between the side plates (not shown) of the apparatus through bearing members, and the bearing members are biased upwardly toward the fixing roller by biasing members (not shown) whereby the elastic pressure roller 128 is pressed against the underside of the fixing roller 127 with a predetermined pressure force against the elasticity of the silicone rubber layer to thereby form a pressure contact nip portion (fixing nip portion) N of a predetermined width by the elastic strain of the silicone rubber layer.

A fixing roller gear (not shown) is disposed integrally on one end portion of the fixing roller 127, and a rotational force is transmitted from a driving system (not shown) to the gear and the fixing roller is rotatively driven at a predetermined peripheral speed in the clockwise direction indicated by the arrow A. The pressure roller 128 is rotated in the counter-clockwise direction indicated by the arrow B following this rotative driving of the fixing roller 127.

The reference numeral 30 designates an electromagnetic induction coil unit, which is magnetic flux generating means, and the reference numeral 9 denotes a retrofitting magnetic material core mounted on the electromagnetic induction coil unit. The electromagnetic induction coil unit 30 having the magnetic material core 9 mounted thereon is inserted into the fixing roller 127 and is non-rotatably disposed in place.

By the action of a high-frequency magnetic flux generated by a high-frequency current being supplied from an excitation circuit (not shown) to an electromagnetic induction coil to be described in the electromagnetic induction coil unit 30, an eddy current is produced in the fixing roller 127 comprising a metal conductor (electromagnetic induction heat generating member) and the fixing roller 127 is electromagnetic-induction-heated by Joule heat. The temperature rise of this fixing roller 127 is detected by a temperature detecting element (not shown), and the supply of electric power from the excitation circuit to an excitation coil is controlled so that the temperature of the fixing roller 127 may be attempered and maintained at a predetermined fixing temperature.

When in the state in which the fixing roller 127 is rotatively driven and the temperature of the fixing roller is attempered and controlled at the predetermined fixing temperature, the recording material S bearing an unfixed toner image t thereon is introduced into the fixing nip portion N, the recording material S is nipped by and conveyed through the fixing nip portion N, and in the process of being nipped and conveyed, the toner image is heated by the heat of the fixing roller 127 and is subjected to the pressure of the fixing nip portion N and is thus fixed by heat and pressure.

The reference numeral 130 denotes a stripping claw which serves to restrain the recording material S from twining around the fixing roller 127, and strip it from the fixing roller 127.

Figure 3:
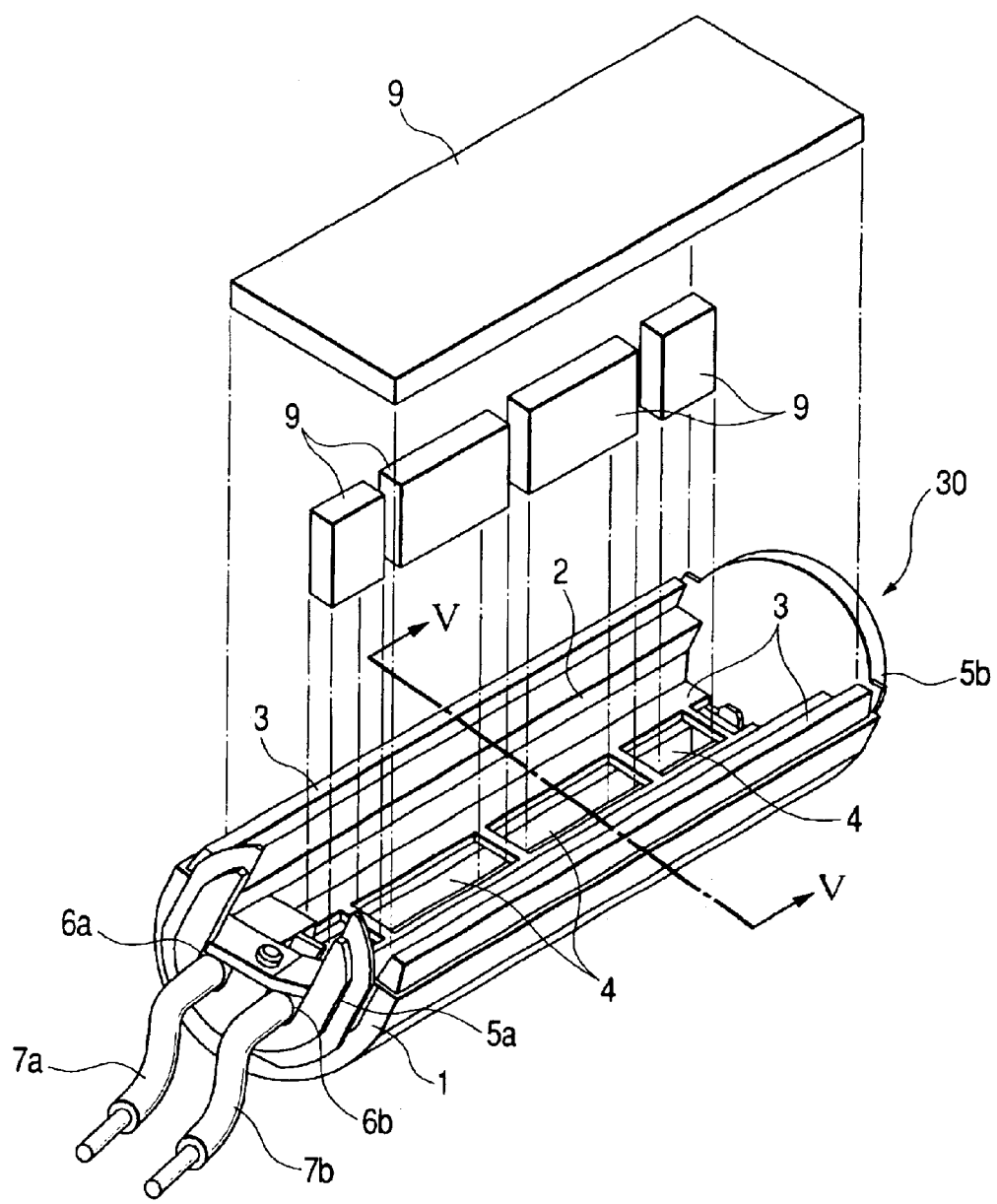
FIG. 3 is an exploded perspective view of an electromagnetic induction coil unit and a magnetic material core mounted thereon.
Figure 4:
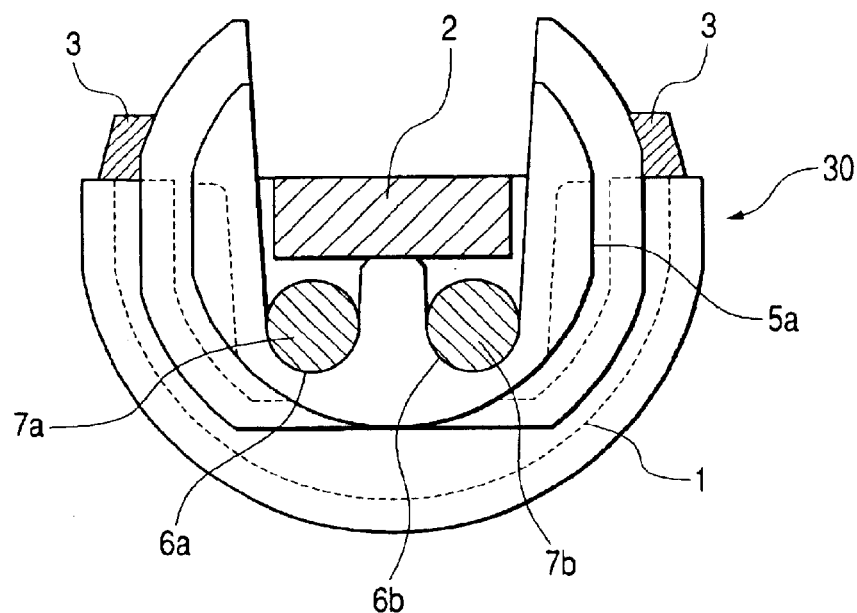
FIG. 4 is a side view of the electromagnetic induction coil unit.
Figure 5:
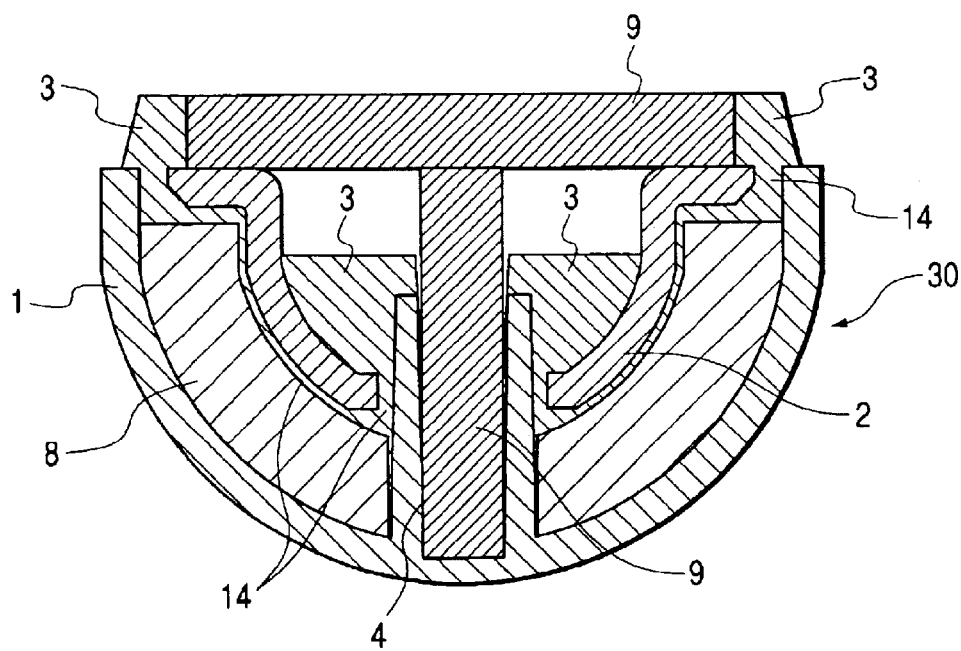
FIG. 5 is an enlarged cross-sectional view of the electromagnetic induction coil unit with the magnetic material core mounted thereon taken along the line V—V of FIG. 3.

(3) Structure of the Electromagnetic Induction Coil Unit 30 and Method of Manufacturing the Same FIG. 3 is an exploded perspective view of the electromagnetic induction coil unit 30 and the magnetic material core 9 mounted thereon, FIG. 4 is a side view of the electromagnetic induction coil unit 30, and FIG. 5 is an enlarged cross-sectional view of the electromagnetic induction coil unit 30 with the magnetic material core 9 mounted thereon taken along the line V—V of FIG. 3.

The electromagnetic induction coil unit 30 is basically comprised of a coil holder member (a first frame) 1, an electromagnetic induction coil 8, a coil holding-down member 2 (a second frame) and a molded portion 3 (hereinafter referred to as the envelop-molded portion) formed by resin-enveloped molding (plastic molding).

The construction of the electromagnetic induction coil unit 30 will now be described along the assembling procedure.

Figure 6:
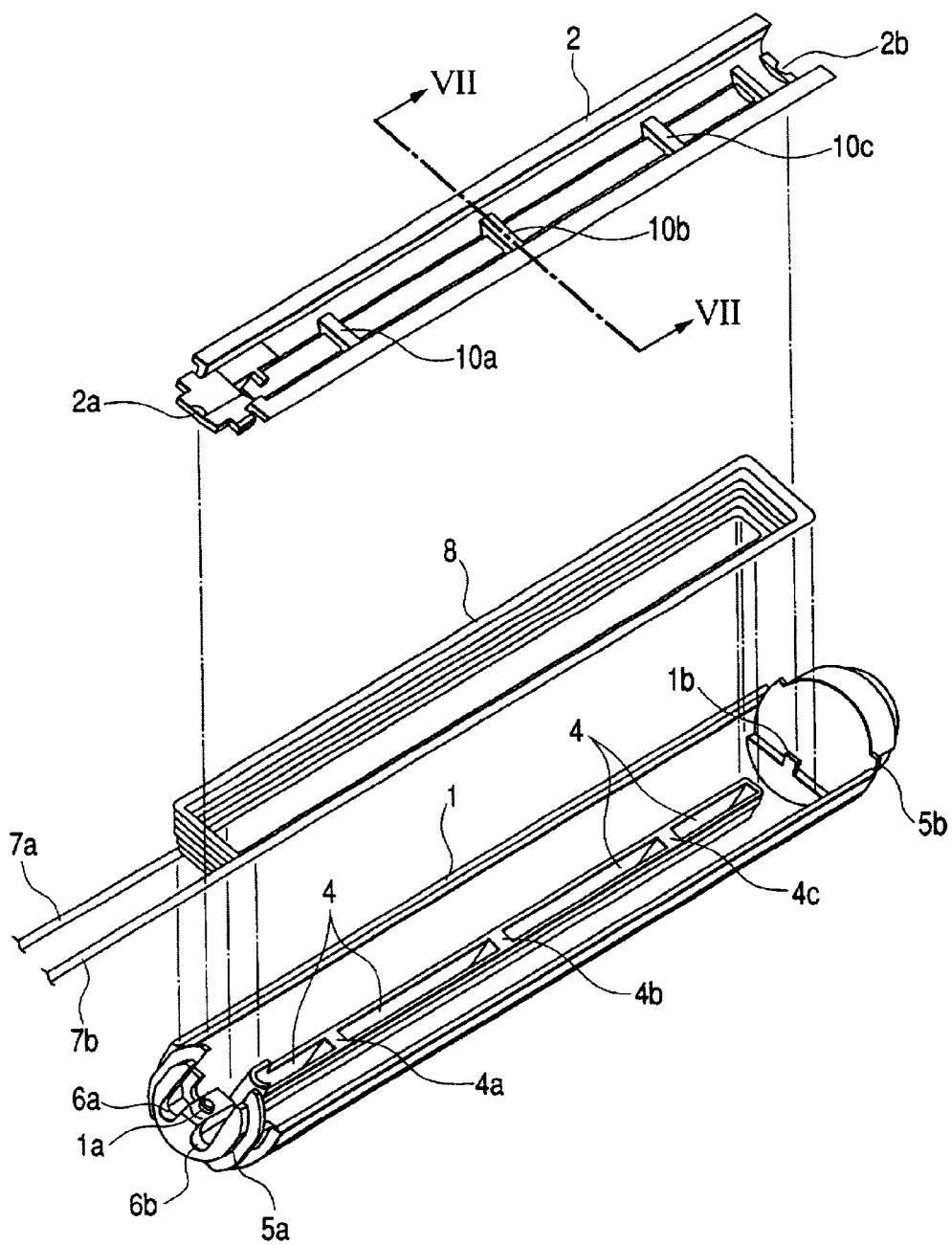
FIG. 6 is an exploded perspective view of a coil holder member, an electromagnetic induction coil and a coil holding-down member which together constitute the electromagnetic induction coil unit.
Figure 7:
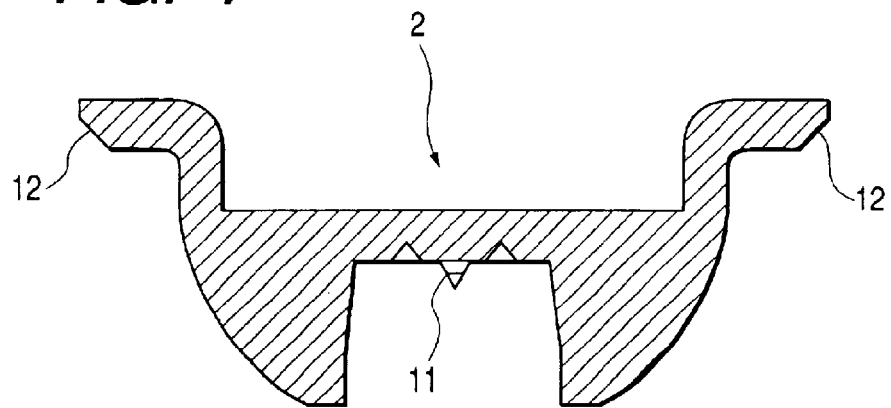
FIG. 7 is an enlarged transverse cross-sectional view of the coil holding-down member taken along the line VII—VII of FIG. 6.

1) FIG. 6 is an exploded perspective view of the three members, i.e., the coil holder member 1, the electromagnetic induction coil 8 and the coil holding-down member 2 which together constitute the electromagnetic induction coil unit 30. FIG. 7 is an enlarged transverse cross-sectional view of the coil holding-down member 2 taken along the line VII—VII of FIG. 6.

The coil holder member 1 and the coil holding-down member 2 are manufactured in advance by the well-known injection molding.

2) The electromagnetic induction coil (hereinafter referred to as the coil) 8 is set on the coil holder member 1, and then the joining (fixing) of the coil holding-down member 2 and the coil holder member 1 is effected.

Figure 8:
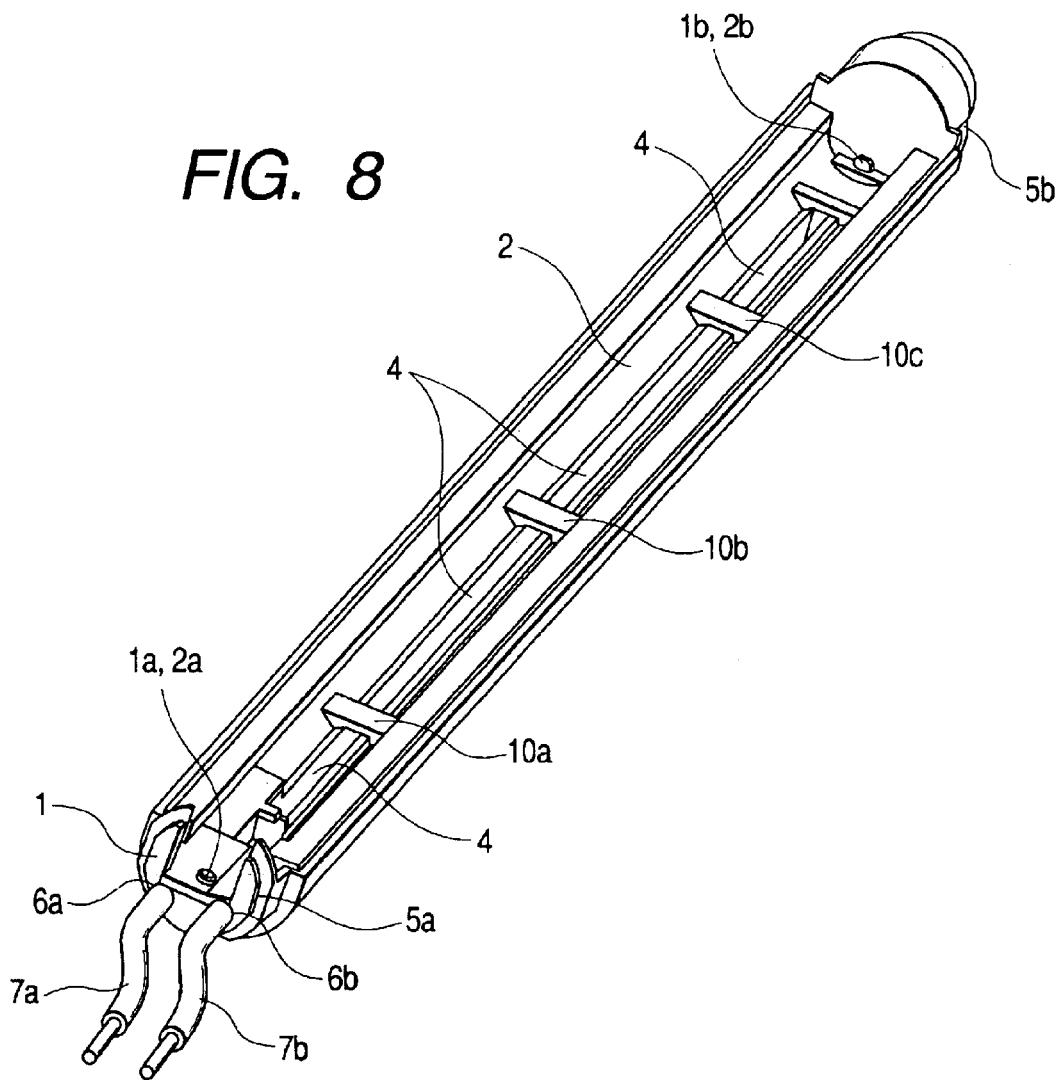
FIG. 8 is a perspective view showing an assembled state (joined body) before resin-enveloped molding in which a coil holder, the coil holding-down member and the coil are made into a unit.
Figure 9:
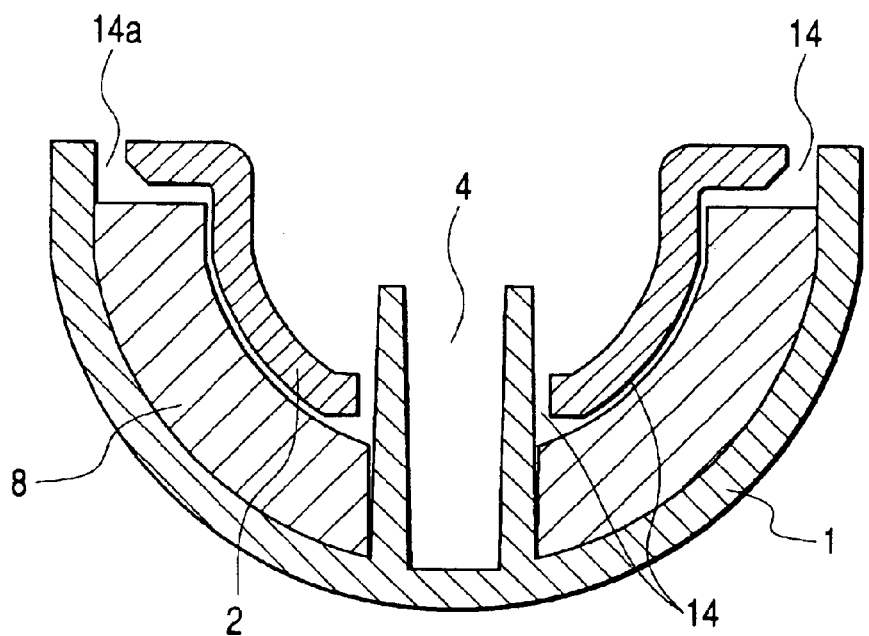
FIG. 9 is an enlarged transverse cross-sectional view of the joined body.

FIG. 8 is a perspective view showing the assembled state before the resin-enveloped molding in which the coil holder member 1, the coil holding-down member 2 and the coil 8 are integrally joined together (hereinafter referred to as the joined body), and FIG. 9 is an enlarged transverse cross-sectional view of this joined body 1, 8, 2.

It is a characteristic method of manufacturing the electromagnetic induction coil unit 30 of the present invention to provisionally fix the coil 8 between the coil holder member 1 and the coil holding-down member 2 with a minute gap 14 left before the resin-enveloped molding which will be described later is effected, as described above.

The coil 8 is set in a space formed by the coil holder member 1 and the coil holding-down member 2 being joined together with the minute gap 14 provided therein. The coil 8 is held down between the coil holder member 1 and the coil holding-down member 2, whereby the floating, coming-off, falling-off, inclination or the like of the coil 8 is eliminated to thereby enhance the productivity of the resin-enveloped molding at the next step.

It has been found by an experiment that the wild movement of the coil 8 in the minute gap is in a minute gap which does not adversely affect the performance of electromagnetic induction heating, and is desirably 0.3 mm or less.

The coil holder member 1 having the coil 8 mounted thereon and the coil holding-down member 2 which functions to provisionally fix the coil 8 against movement are joined together after the positioning convex portions 1a and 1b of the coil holder member 1 and the positioning recesses 2a and 2b of the coil holding-down member 2 are fitted to each other and positioned.

Ultrasonic welding is used as the method of joining the coil holder member 1 and the coil holding-down member 2 together. Of course, use can also be made of a securing method by a well-known adhesive agent, but an adhesive agent which can withstand an environment at such a fixing temperature as exceeds 200° C. is expensive and has a limitation in the securing condition, and may spoil the working property and therefore, ultrasonic welding is desirable. If there is other securing condition which can withstand the environment in a high temperature range, there will be no problem in using a method therefor.

The coil holding-down member 2 is provided with projection-shaped portions 11 (FIG. 7) which are joining portions by ultrasonic welding at several locations. Thereby, the coil holding-down member 2 is provisionally fixed to the coil holder member 1 by ultrasonic welding.

3) After the coil holder member 1 and the coil holding-down member 2 have been joined together, the above-described joined body 1, 8, 2 is molded into the envelop-molded portion 3 as shown in FIGS. 3, 4 and 5 by resin-enveloped molding which will be described later, whereby the electromagnetic induction coil unit 30 of the present invention is manufactured.

By the envelop-molded portion 3, the coil 8 is completely electrically insulated from the outside, except for cord terminal portions (the lead wire of the coil and the starting end portion and terminal end portion of the coil) 7a and 7b for the inputting of electric power.

As regards the electromagnetic induction coil unit 30 manufactured in this manner, the coil 8 is restrained by the coil holder member 1 and the coil holding-down member 2 and therefore, even if resin-enveloped molding is effected, it will never happen that the electromagnetic induction coil is greatly deformed and moved by the pressure and flowing of the resin.

Since the coil 8 is covered with the coil holder member 1 and the coil holding-down member 2 uniform in the thickness of the resin, the thickness of the resin by the well-known injection molding can be ensured substantially over the entire area.

4) The resin-enveloped molding method for the electromagnetic induction coil unit 30 will now be described in detail.

Figure 10:
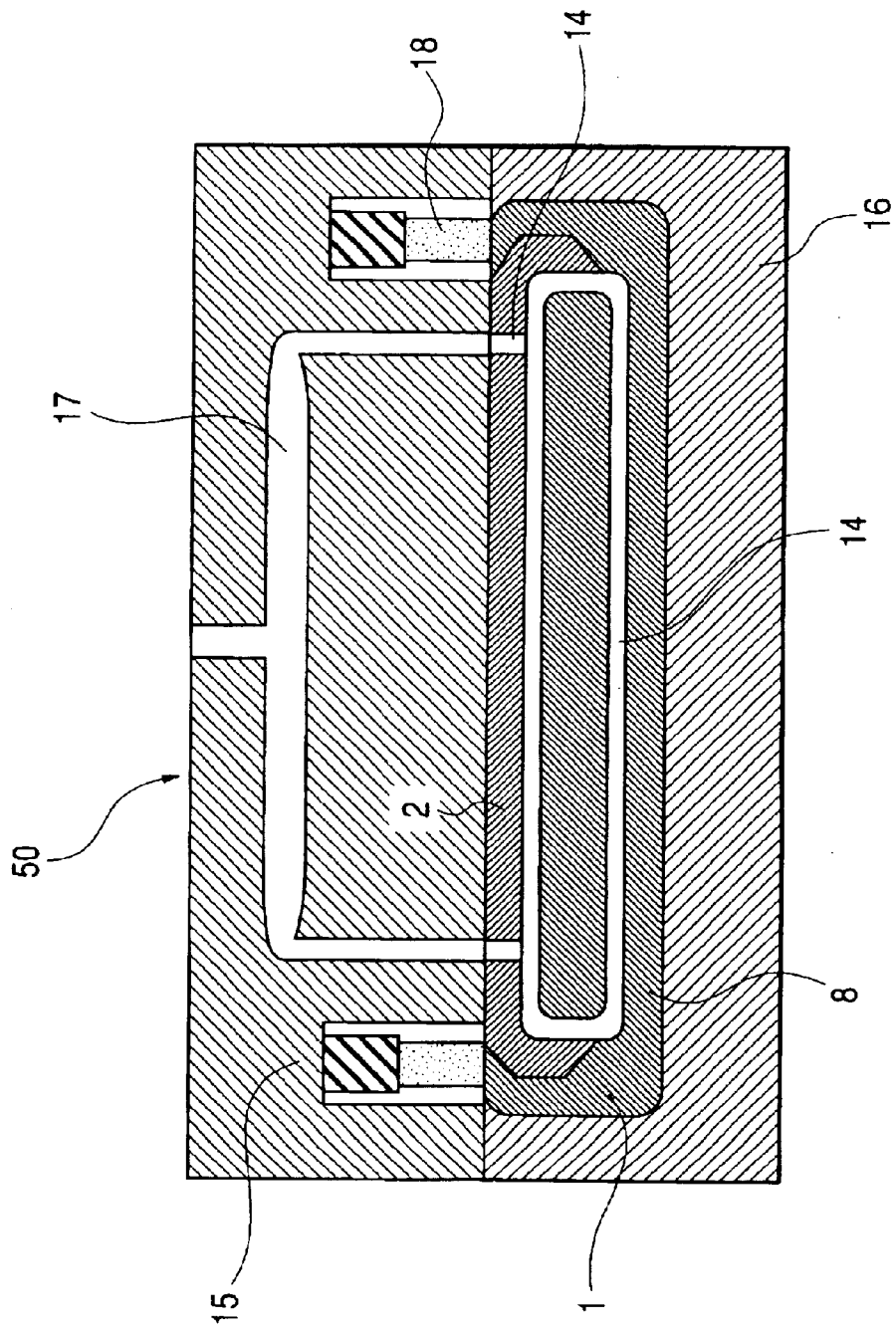
FIG. 10 is a schematic view of the joined body during the resin-enveloped molding thereof.
Figure 11:
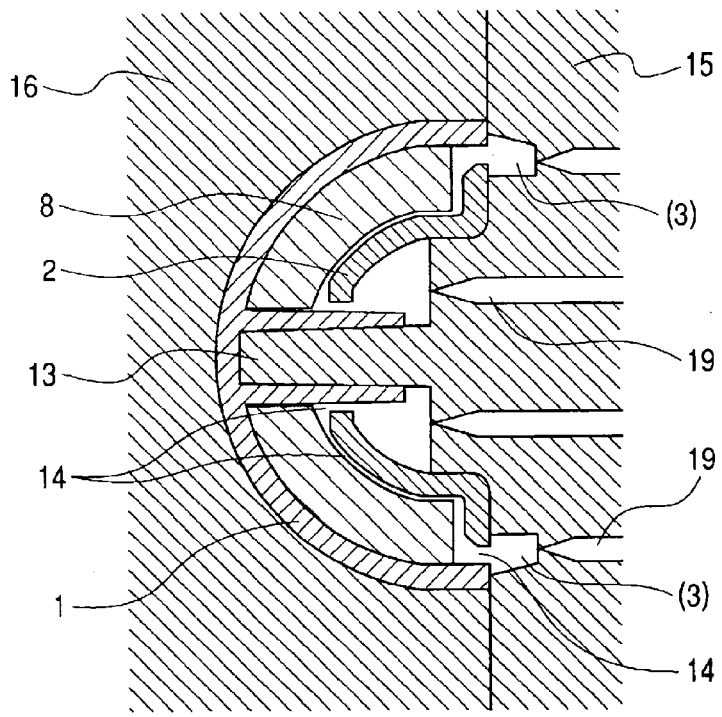
FIG. 11 is a cross-sectional view (pin gate) of the joined body during the resin-enveloped molding thereof.

FIG. 10 is a construction illustration for illustrating the lengthwise direction of an injection molding metal mold 50 for effecting resin-enveloped molding. FIG. 11 is a construction illustration for illustrating the injection molding metal mold 50 when seen from the same direction as the line V—V of FIG. 3.

The injection molding metal mold 50 for effecting resin-enveloped molding is broadly comprised of a fixed side metal mold 15 and a movable side metal mold 16. The fixed side metal mold 15 is provided with a runner 17 for pouring resin to the envelop-molded portion 3, and a mechanism 18 using an extending and shortening type pin for fixing the joined body 1, 8, 2 mounted thereon so as not to move with the mold fastening of the metal mold.

Resin injected from an injection molding machine (not shown) passes through the runner 17 and fills a gap 14a.

The steps of manufacturing the electromagnetic induction coil unit 30 will now be described.

(i) As previously described, the joined body 1, 8, 2 (FIGS. 6, 7, 8 and 9) constituted by the coil 8 being mounted on the coil holder member 1, and combined with the coil holding-down member 2, and made into a unit by being subjected to ultrasonic welding is prepared.

(ii) The joined body 1, 8, 2 is set on the movable side metal mold 16 of the injection molding metal mold 50 for effecting resin-enveloped molding.

(iii) The metal molds 15 and 16 are closed. At this time, the extending and shortening type pin 18 provided on the fixed side metal mold 15 fixes the joined body 1, 8, 2 so that the joined body 1, 8, 2 mounted in the metal mold may not move with the movement of the metal mold.

(iv) After the completion of the mold fastening, molten resin is injected by the injection molding machine, and fills the gap 14 via a sprue, a runner and a gate.

(v) The molten resin filling the gap is cooled and cured.

(vi) The metal molds 15 and 16 are opened and the electromagnetic induction coil unit 30 is taken out.

The mounting of the joined body 1, 8, 2 onto the metal mold is effected by the utilization of opposite end shape portions 5a and 5b provided on the coil holder member 1, but the metal mold is provided with the mechanism 18 using the extending and shortening type pin in order to fix the joined body 1, 8, 2 so as not to move during the mold fastening.

Further, a metal mold frame 13 comes into a shape portion 4 provided on the coil holder member 1, whereby the joined body 1, 8, 2 is held at a predetermined location in the metal mold.

The joined body 1, 8, 2 is provided with the gap (resin flow path) 14 for pouring the resin onto the electromagnetic induction coil 8 and bringing it into close contact therewith during resin-enveloped molding.

After the mold fastening, the resin is poured into the gap 14 provided between the coil holder member 1 and the coil holding-down member 2, whereby the resin enveloping of the electromagnetic induction coil 8 is achieved.

The fixing of the electromagnetic induction coil 8 is not done by a method using a holding pin and therefore, a minute aperture which would otherwise be created from the badness of the timing for retracting the holding pin is not created.

Also, the metal mold does not require a number of holding pins for fixing the electromagnetic induction coil and a device for controlling the operation of the holding pins and therefore, the structure of the metal mold and molding facilities become simple, and a reduction in the manufacturing cost of the coil unit can be achieved.

(Second Embodiment)

Figure 12:
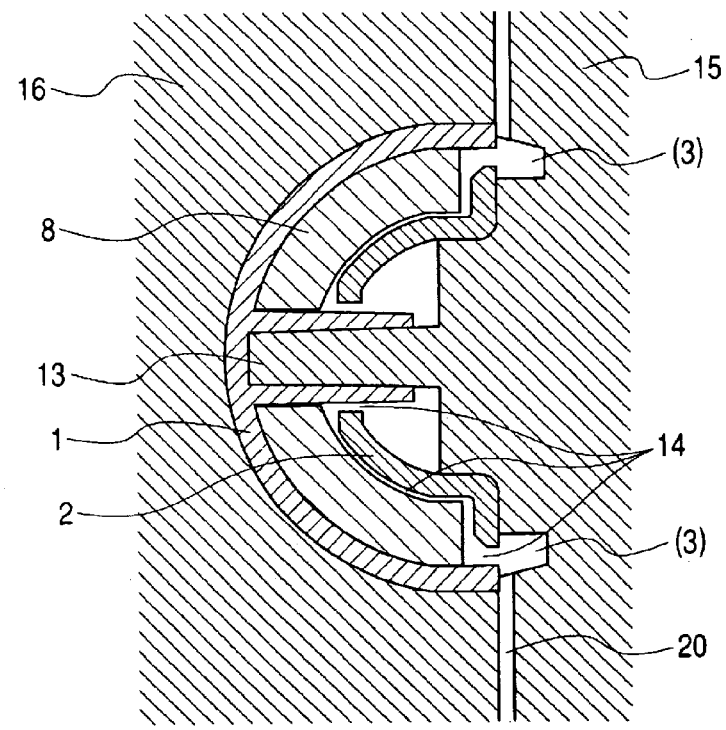
FIG. 12 is a cross-sectional view (side gage) of the joined body during the resin-enveloped molding thereof.

FIG. 12 shows a second embodiment of the resin-enveloped molding method for the joined body 1, 8, 2. This resin enveloped molding method is a molding method using a side gate 20. In the case of a molding method using the side gate 20 in the resin-enveloped molding, injected resin flows into the shape portion 3 formed by envelop molding and thereafter flows into the electromagnetic induction coil 8 and therefore, it never happens that the electromagnetic induction coil 8 directly receives the injection pressure of the resin. That is, the breaking of the coil by the injection pressure can be prevented by the shape portion 3 formed by the resin-enveloped molding to thereby reduce the injury of the coil.

The envelop molding portion 3 formed by the resin-enveloped molding has the function of holding a magnetic material core 9 (hereinafter referred to as the core) as shown in FIG. 5.

Thus, the coil holding-down member 2 need not be provided with a core holding shape. If the coil holding-down member 2 is provided with a rib for holding the core 9, the construction of the metal mold during the resin-enveloped molding will become complicated. It will also be very difficult to keep the close contact property of the metal mold, and a reduction in productivity is feared.

After the resin once flows into the envelop-molded portion 3, the resin flows into the coil 8 and therefore, the space of the envelop-molded portion 3 also has the effect of alleviating the influence of the injury, breaking or the like of the electromagnetic induction coil by the injection pressure of the resin upon the coil during envelop molding.

While the T-shaped magnetic material core 9 is used in the present embodiment, the shape of the core is not restricted. Also, of course, it is possible to use the electromagnetic induction coil unit 30 of the present invention in the electromagnetic induction heating construction having no core.

In order to make the joint of the coil holder member 1 with the coil holding-down member 2 and the envelop-molded portion 3 good, it is desirable that the coil holder member 1 and the coil holding-down member 2 be formed of the same resin as the enveloping resin.

Also, actually used insulating resin is liquid crystal polymer resin (LCP), polyphenylene sulfide resin (PPS) or phenol resin.

The opposite ends of the coil holder member 1 are provided with shape portions 5a and 5b performing the positioning function when the electromagnetic induction coil unit 30 is carried onto the fixing device. The positioning form in the present embodiment is a form in which a convex portion shape is fitted into a well-known aperture shape. The fixing device side also has positioning aperture portions correspondingly to the positioning portions 5a and 5b at the opposite ends of the coil holder member 1. In this manner, the electromagnetic induction coil unit 30 is positioned in the fixing device.

Further, the positioning portions 5a and 5b also perform the positioning function for the metal mold when the joined body 1, 8, 2 made integral by the coil 8 being set on the coil holder member 1 and combined with the coil holding-down member 2 is set in the metal mold.

Thus, the positioning portions 5a and 5b of the coil holder member 1 become positioning portions common to the fixing device and the metal mold, and the shape of the coil holder member 1 can be made simple, and this can lead to a reduction in the manufacturing cost.

Also, when in the joined body 1, 8, 2, the starting end portion 7a and terminal end portion 7b of the coil 8 are put together at a location and led out, the leakage of the resin from the lead wire portion is feared during the resin-enveloped molding. Further, during the resin-enveloped molding, the starting end portion 7a and terminal end portion 7b of the coil 8 may sometimes be deformed and moved by the injection pressure.

In the case of the present electromagnetic induction coil unit 30, the starting end portion and the terminal end portion are independently held in dedicated U-grooves, whereby each wire of the cord portion can be held down without any gap. That is, one end of the coil holder member 1 is formed with U-groove shapes 6a and 6b for holding the starting end portion 7a and terminal end portion 7b, of the lead wire (cord) of the coil 8. By thus enhancing the sealability, the leakage of the resin is prevented.

The starting end portion 7a and terminal end portion 7b of the cord are not regulated for the locations of the U-grooves 6a and 6b, but either of the starting end portion 7a and terminal end portion 7b of the cord may correspond to the U-groove 6a or 6b.

As shown in FIG. 6, a box-shaped portion 4 for setting the magnetic material core 9 is provided in the central portion of the coil holder member 1. The box-shaped portion 4 is divided into four locations by partition portions 4a, 4b and 4c. The provision of these partition portions is effective to stabilize the dimension of the box-shaped portion 4, and when a plurality of magnetic material cores 9 are used, it will also decrease the backlash caused by a dimensional tolerance cumulated by arranging many magnetic material cores.

Correspondingly to the partition portions 4a, 4b and 4c of the coil holder member 1, the coil holding-down member 2 can be provided with bridge shapes 10a, 10b and 10c. When these bridge shapes are absent, it is feared that warp will occur to the inside of the coil holding-down member 2, but these bridge shapes also prevent the warp of the inside.

Further, the partition portions 4a, 4b and 4c can play the role as the joint portion of the coil holder member 1 and the coil holding-down member 2.

Also, during the resin-enveloped molding, as shown in FIG. 11 or 12, a central frame portion 13 which is a portion of the metal mold is also inserted into the box-shaped portion 4 in the central portion of the coil holder member 1. Thereby, after the resin-enveloped molding, the entry of the envelop-molding resin into the interior of the box-shaped portion 4 of the coil holder member 1 can be prevented and therefore, the magnetic material core 9 can be set smoothly.

The coil holding-down member 2 is provided with a slope shape 12 (FIG. 7) to improve the joint strength thereof with the envelop-molded portion 3 and make it easy for the resin during the envelop molding to flow. By this shape, the resin flow path is enlarged from the entrance for the resin toward the inner part, whereby the ease of flow of the resin during the resin enveloped molding is improved.

Also, by providing the slope shape 12, whereby the joint area with the envelop-molded portion 3 becomes large, whereby an improvement in the joint strength becomes possible. That is, the strength of the envelop molding portion 3 against exfoliation and breakage is improved.

Of course, for such a construction of the fixing device that the electrical insulating distance can be obtained sufficiently, the electromagnetic induction coil unit 30 can be used in the form of the joined body 1, 8, 2 (FIG. 8) without resin-enveloped molding provided by the coil holder member 1, the coil holding-down member 2 and the coil 8 being joined together into a unit.

(Third Embodiment)

A further embodiment will be described below.

Figure 13:
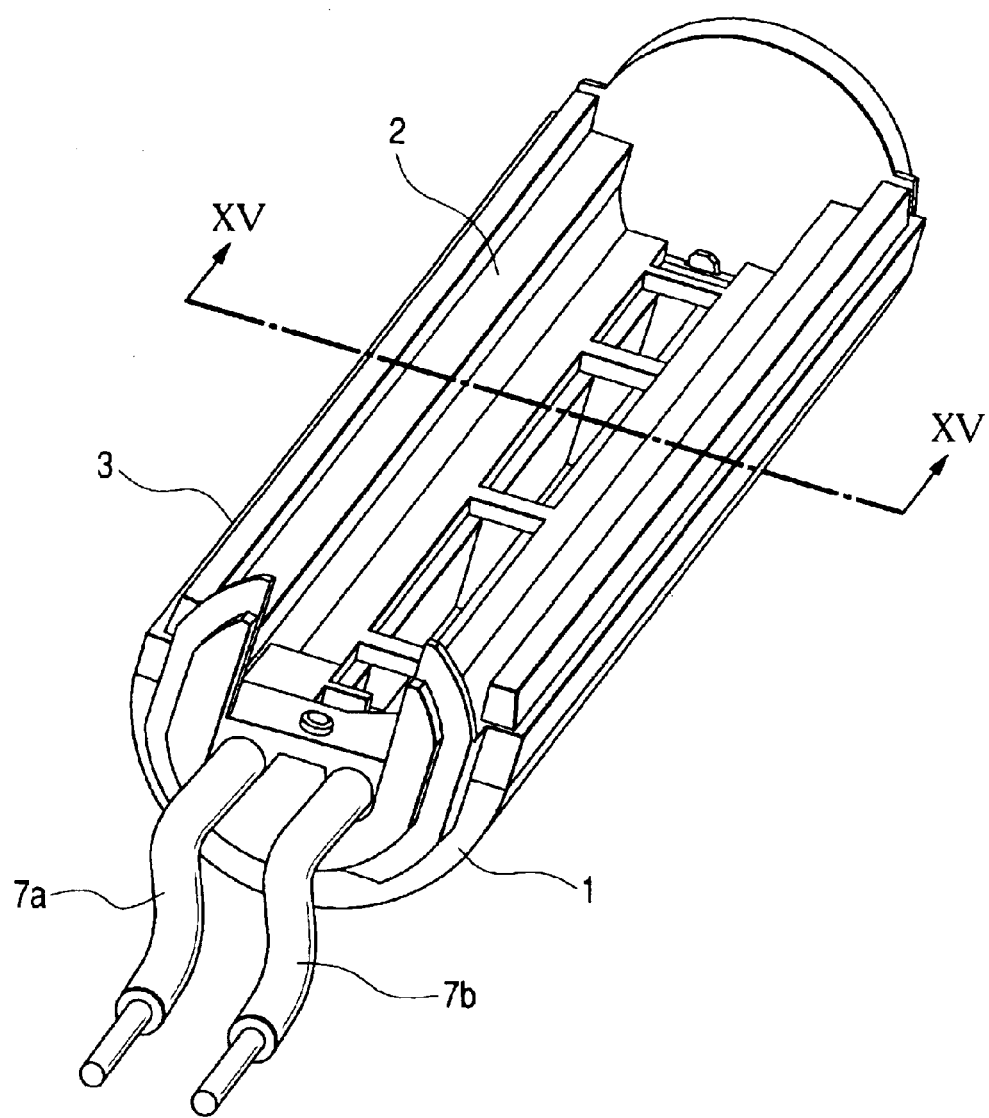
FIG. 13 is a perspective view of an electromagnetic induction coil unit according to a third embodiment of the present invention.
Figure 14:
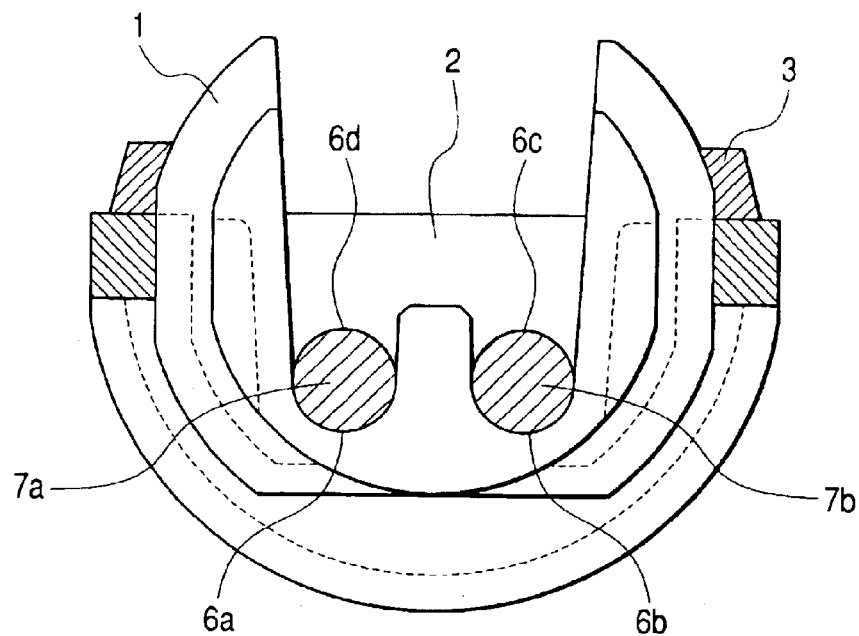
FIG. 14 is a side view of the electromagnetic induction coil unit according to the third embodiment of the present invention.
Figure 15:
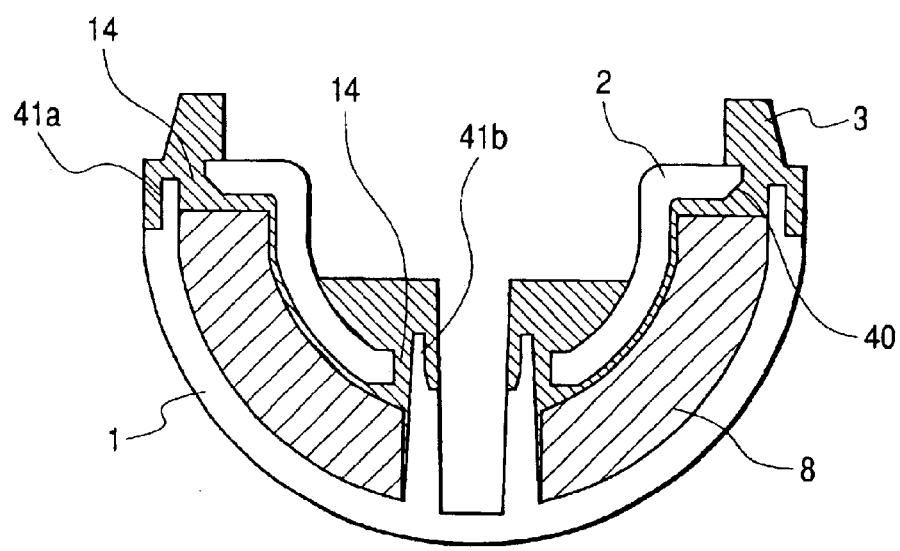
FIG. 15 is an enlarged cross-sectional view of the electromagnetic induction coil unit according to the third embodiment of the present invention taken along the line XV—XV of FIG. 13.
Figure 16:
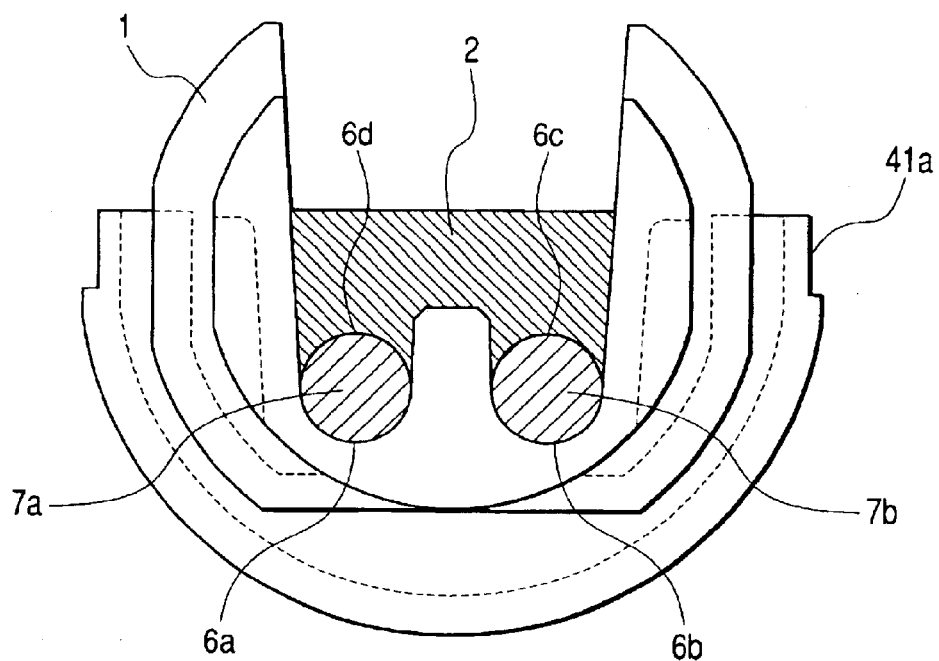
FIG. 16 is a side view of a joined body according to the third embodiment of the present invention.

FIG. 13 is a perspective view of the electromagnetic induction coil unit of the present invention, FIG. 14 is a side view of the electromagnetic induction coil unit, and FIG. 15 is an enlarged cross-sectional view of the electromagnetic induction coil unit taken along the line XV—XV of FIG. 13. FIG. 16 is a side view of the joined body 1, 8, 2, and FIG. 17 is an enlarged cross-sectional view of this joined body.

The electromagnetic induction coil unit is basically comprised of a coil holder member 1, an electromagnetic induction coil 8, a coil holding-down member 2 and a molded portion (hereinafter referred to as the envelop-molded portion) 3 formed by resin-enveloped molding.

Figure 17:
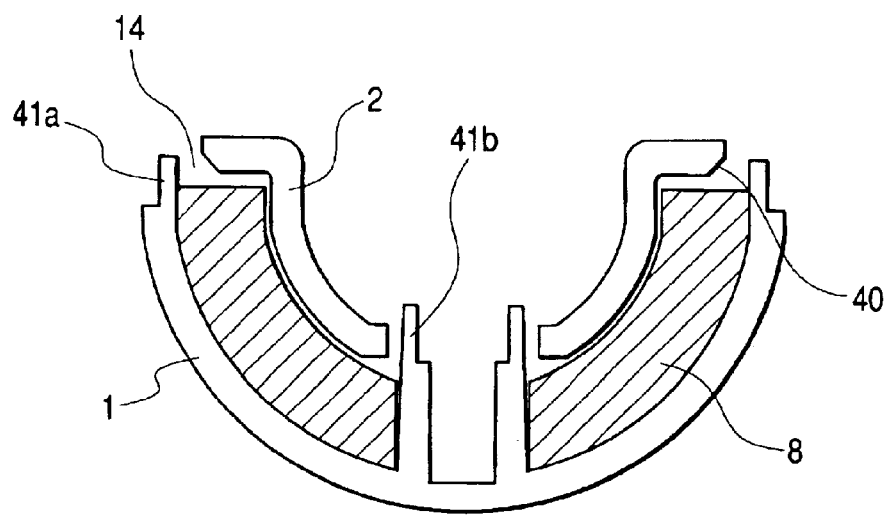
FIG. 17 is an enlarged transverse cross-sectional view of the joined body according to the third embodiment of the present invention.

It is the characteristic construction of the electromagnetic induction coil unit of the present invention to provisionally fix the electromagnetic induction coil 8 between the coil holder member 1 and the coil holding-down member 2 except for an enveloping resin staying portion 14, as described above, before the resin-enveloped molding is effected (FIGS. 16 and 17).

In the cross-sectional view of FIG. 15, the coil holder member 1 is provided with a shape portion 41 (41a, 41b) thinner than the basic thickness thereof, and during envelop molding, this thin shape portion is surrounded by insulating resin (envelop-molded member 3), whereby they are made into a unit. As compared with the joint portion 14 of the coil holder member 1 of the electromagnetic induction coil unit (FIGS. 3 and 5) and the envelop-molded member 3, the area of the joint portion is enlarged, whereby the joint force is improved and further, by the molding contraction force when the insulating resin which has flowed thereto by envelop molding is cooled and cured, the joint force is improved.

Figure 18A:
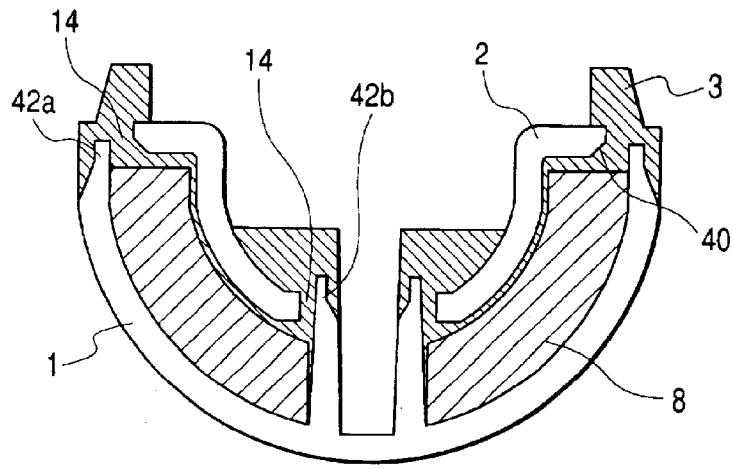
FIGS. 18A, 18B and 18C are enlarged transverse cross-sectional views of the electromagnetic induction coil unit according to the third embodiment of the present invention.
Figure 18B:
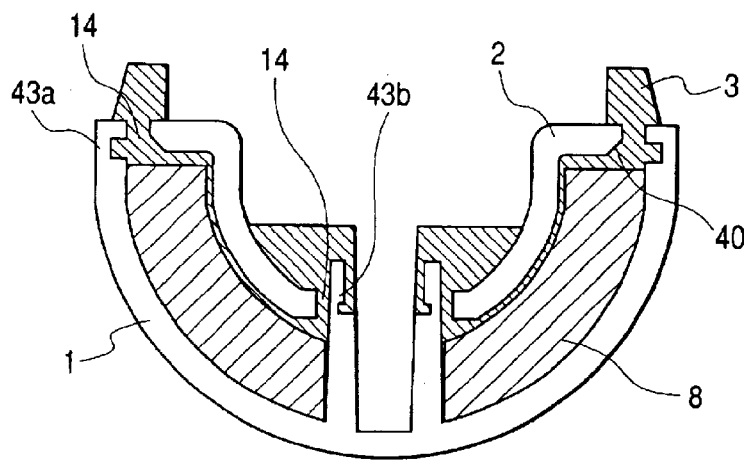
Figure 18C:
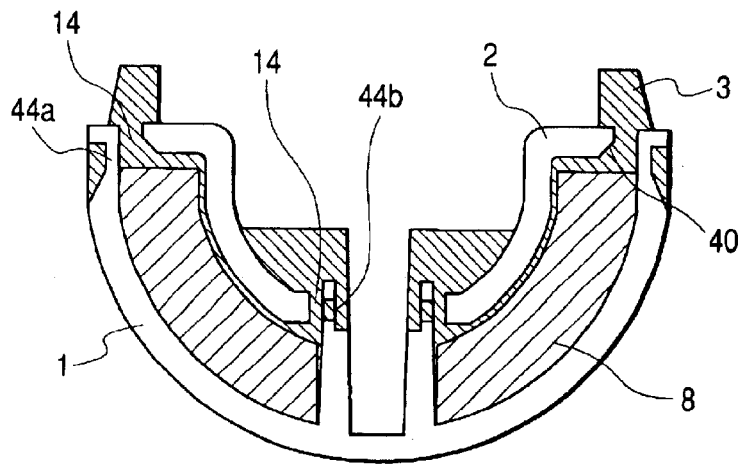
Figure 19:
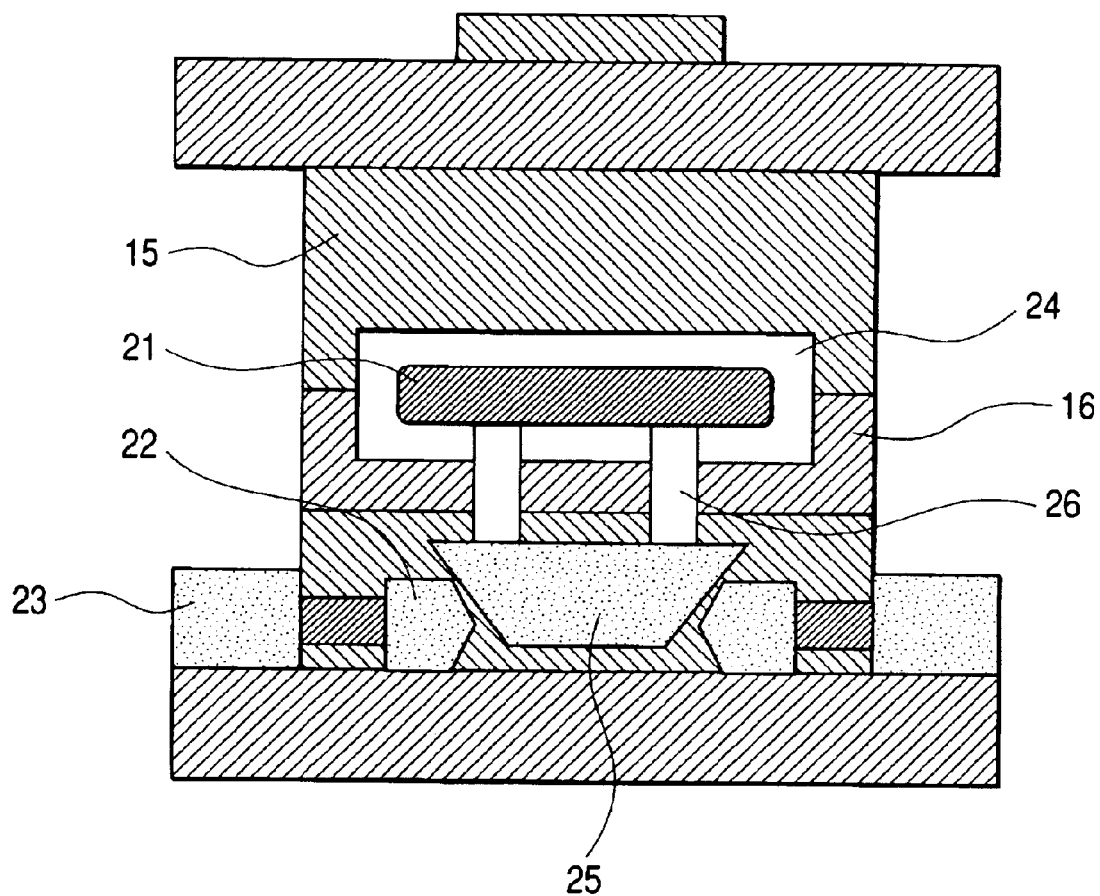
FIG. 19 is an illustration of the conventional manufacturing method.

Also, other embodiments of the thin shape portion 41 provided on the coil holder member 1 include a shape 42 (42a, 42b), a shape 43 (43a, 43b) and a shape 44 (44a, 44b), which are shown in FIGS. 18A, 18B and 18C, respectively.

In FIG. 18A, the coil holder member 1 is provided with an inclined shape 42 (42a, 42b) connecting from the basic thickness thereof to a thin shape portion, and like the afore described thin shape portion 41 (41a, 41b), an improvement in the joint force by the area of the joint portion being enlarged is achieved and further, by the molding contraction force when the insulating resin which has flowed thereto by envelop molding is cooled and cored, the joint force is improved.

In FIG. 18B, a groove shape 43 (43a, 43b) is provided on that surface of the coil holder member 1 which contacts with the insulating resin, and they become a unit by the insulting resin which has flowed into the groove by envelop-molding being cured. The groove shape 43 has the function of suppressing the envelop-molded member 3 pushed up by the reaction force (spring-back) of the electromagnetic induction coil compressed by the pressure of the resin during envelop-molding, by mechanical joint.

In FIG. 18C, a through-hole shape 44 (44a, 44b) is provided in that surface of the coil holder member 1 which contacts with the insulating resin, and they become a unit by the insulating resin being cured through the through-hole. The through-hole shape 44, like the aforedescribed groove shape 43, has the function of suppressing the envelop-molded member 3 pushed up by the reaction force (spring-back) of the electromagnetic induction coil compressed by the pressure of the resin during envelop molding, by mechanical joint.

The shape 42, the shape 43 and the shape 44 provided on the coil holder member 1 are not restricted in the combination thereof, but can also be provided with the combination thereof changed.

The coil holding-down member 2 is provided with such an inclined shape 40 as connects from the basic thickness to the thin portion, and during the envelop-molding, the insulating resin covers this inclined shape so as to surround it, whereby they become a unit. This enlarges the joint area with the envelop-molded member 3 to thereby improve the joint force, and further by the molding contraction force when the insulating resin which has flowed thereto by the envelop-molding is cooled and cured, the joint force of the envelop-molded member 3 and the coil holding-down member 2 is improved.

Enlarged portions 14, which will be described below, for the enveloping resin to stay therein are provided adjacent the joint portion of the coil holder member 1 and the envelop-molded member 3 and the joint portion of the coil holding-down member 2 and the envelop-molded material 3 and further, it is the characteristic construction of the electromagnetic induction coil unit of the present invention that these enlarged portions are adjacent to the electromagnetic induction coil 8.

The enlarged portions 14 for the enveloping resin to stay therein are provided adjacent to the thin shape 41 (or the shape 42, 43 or 44) provided on the coil holder member 1 and the inclined shape 40 provided on the coil holding-down member 2. These enlarged portions 14 are for making the enveloping resin which has flowed thereinto stay therein to thereby prevent the enveloping resin from being cooled and cured in a moment, and by the heat thereof, the thermal fusion of the thin shape 41 and the inclined shape 40 adjacent to these enlarged portions 14 and the enveloping resin is made easy to thereby improve the joint strength of the thin shape 41 and the inclined shape 40 to the envelop-molded member 3.

Further, in these enlarged portions 14, the pressure of the enveloping resin which has flowed thereinto is mitigated and therefore, by these enlarged portions 14 being provided adjacent to the electromagnetic induction coil 8, there is the effect that the pressure of the enveloping resin against the electromagnetic induction coil can be mitigated and the reaction force (spring-back) of the electromagnetic induction coil can be mitigated.

In the electromagnetic induction coil unit of the present invention, each wire of the cord portion is independently held in the dedicated U-shaped groove, whereby it can be held down without any gap. That is, at one end of the coil holder member 1 and the coil holding-down member 2, the coil holder member 1 and the coil holding-down member 2 are provided with U-groove shapes 6a, 6b and 6c, 6d, respectively, to hold the starting end portion 7a and terminal end portion 7b of the lead wire (cord) of the electromagnetic induction coil 8. The starting end portion 7a and terminal end portion 7b of the cord are not regulated for the locations of the U-groove shapes 6a, 6b and 6c, 6d, but either of the starting end portion 7a and terminal end portion 7b of the cord may correspond to the U-groove shapes 6a, 6b and 6c, 6d.

The sealability is thus enhanced to thereby prevent the leakage of the resin during the envelop-molding. Also, in the manufacture, the holding of the lead wire which is high in sealability can be effected in the assembled state before the resin-enveloped molding shown in FIG. 4 wherein the coil holder member 1, the coil holding-down member 2 and the electromagnetic induction coil 8 are made into a unit and therefore, there is not the possibility of the damage and breaking of the cover of the lead wire by providing a holding mechanism for the lead wire in the metal mold, and compressing it and making it hold the lead wire during the mold fastening of the metal mold. Also, no holding mechanism for the lead wire is provided in the metal mold, whereby the adjustment of the amount of compression of the lead wire during the mold fastening and the highly accurate machining of the holding portion are not required.

The effects of the above-described embodiments will be summed up below.

The electromagnetic induction coil 8 is restrained by the coil holder member 1 and the coil holding-down member 2 and therefore, even if resin-enveloped molding is effected, it will never happen that the electromagnetic induction coil is greatly deformed and moved by the pressure and flowing of the resin.

Since the electromagnetic induction coil 8 is covered with the coil holder member 1 and the coil holding-down member 2 which are uniform in thickness, the required thickness of the resin can be reliably ensured.

The fixing of the electromagnetic induction coil is not done by a method using a holding pin and therefore, there is not created a minute aperture which would otherwise be created from the badness of the timing at which the holding pin is retracted.

Also, in the metal mold, there are not required a number of holding pins and a device for controlling the operation of the holding pins and therefore, the structure of the metal mold and the molding facilities become simple and a reduction in the manufacturing cost of the coil unit can be achieved.

In the resin-enveloped molding, there is also the effect that the frame 13 of the metal mold is brought into the box-shaped portion 4 for the insertion of the magnetic material core thereinto provided in the coil holder member 1, whereby the joined body is completely held at a predetermined location in the metal mold, and the resin is prevented from flowing into the box-shaped portion 4.

Also, the box-shaped portion 4 is divided into several locations, whereby the warping of the box-shaped portion 4 is prevented.

The partition portions 4a, 4b and 4c of the magnetic material core insertion portion 4 enable bridge shapes 10a, 10b and 10c to be provided in the hollow portion of the coil holding-down member 2, and also serve to prevent the warping of the coil holding-down member 2.

Further, these partition portions can play the role as the joint portion of the coil holder member and the coil holding-down member.

By providing the coil holder member 1 with the U-groove shapes 6a and 6b, and holding the starting end portion 7a and terminal end portion 7b of the induction coil 8 independently of each other, it is possible to prevent the deformation and movement of the starting end portion and the terminal end portion during envelop-molding.

Also, during the resin-enveloped molding, the leakage of the resin becomes liable to occur from the starting end portion and the terminal end portion, but a holding method using a dedicated U-groove corresponding to each of them can easily prevent the leakage of the resin.

In the resin-enveloped molding, in the case of the molding method using a side gate (FIG. 12), the injected resin flows into the shape portion 3 formed by envelop-molding, and thereafter flows into the electromagnetic induction coil and therefore, the electromagnetic induction coil does not directly receive the injection pressure of the resin.

The enveloped shape portion 3 is effective to prevent the electromagnetic induction coil from being damaged or broken by the injection pressure of the resin during the envelop-molding.

The coil holder member 1 and the coil holding-down member 2 have the effect that in the joint portion thereof with the envelop-molded material 3 formed by the envelop-molding, the joint strength is improved more than in the conventional art by the shapes provided in the coil holder member and the coil holding-down member, to thereby prevent bad insulation such as causing the exfoliation of the joint portion by the reaction force (spring-back) of the electromagnetic induction coil during the resin-enveloped molding and the exfoliation on the joined surface by the thermal impact by the temperature rise during use.

An enlarged portion in which the enveloping resin may stay is provided adjacent to the shape for improving the joint strength with the enveloping resin, to thereby prevent the resin having flowed thereinto by envelop-molding from being cooled and cured in a moment, and by the heat thereof, the thermal fusion-bond with the enveloping resin is made easy to thereby improve the joint strength of the shape 8 and the envelop-molded member.

Further, in the enlarged portion 14, the pressure of the enveloping resin having flowed thereinto is mitigated and therefore, by providing the enlarged portion 14 adjacent to the electromagnetic induction coil 8, there is brought about the effect that the pressure of the enveloping resin against the electromagnetic induction coil can be mitigated and the reaction force (spring-back) of the electromagnetic induction coil can be mitigated.

The U-groove shapes for holding the starting end portion and terminal end portion of the lead wire (cord) of the electromagnetic induction coil are provided at one end of the coil holder member 1 and one end of the coil holding-down member 2 and therefore, holding high in sealability can be accomplished during assembly and the metal mold does not require a holding mechanism for the lead wire.

As compared with a method of providing the metal mold with a holding mechanism for the lead wire, and compressing the holding mechanism and making it hold the lead wire during the mold fastening of the metal mold to thereby prevent the leakage of resin, there is not the possibility of the damage of the cover of the lead wire and the breaking of the lead wire caused by the metal mold nipping the lead wire.

Also, the metal mold is not provided with the holding mechanism for the lead wire, whereby the adjustment of the amount of compression of the lead wire during the mold fastening and the highly accurate machining of the holding portion are not required.

As described above, according to the present invention, regarding an electromagnetic induction coil unit of a resin-enveloped type which is a part of a heating apparatus of the electromagnetic induction heating type for heating a material to be heated by the heat generation of an electromagnetic induction heat-generative member, it is possible to solve the problem that when an electromagnetic induction coil is to be enveloped by resin, the coil is deformed and moved by the pressure and flowing of the resin, and provide an electromagnetic induction coil unit free of the deformation and positional movement deviation of the electromagnetic induction coil therein and high in reliability.

While the embodiments of the present invention have been described above, the present invention is not restricted to the above-described embodiments, but all modifications are possible within the technical idea of the present invention.

What is claimed is:

1. A method of manufacturing a coil unit for a heating apparatus for heating a material to be heated by heat of a heat generating member that generates the heat by a magnetic flux from a coil, said method comprising:

a first step of disposing one surface of a coil forming surface on a first frame, said coil having said coil forming surface formed by an arrangement of a coil wire;

a second step of disposing a second frame on an other surface of said coil forming surface, wherein a movement of said coil forming surface between said first frame and said second frame is substantially restricted by said second step;

a third step of pouring liquid resin between said first frame and said second frame after said second step; and a fourth step of curing the liquid resin to fix said coil between said first frame and said second frame after said third step, wherein said coil forming surface is disposed opposite to a surface of said heat generating member.

2. The method according to claim 1, wherein said coil is supported on said first frame, and said second frame is disposed with a minute gap provided between said second frame and said coil.

3. The method according to claim 1, wherein said minute gap is 0.3 mm or less.

4. The method according to claim 1, wherein said first frame has a protrusion on a surface, opposite to said coil, of said first frame, and said protrusion restricts a movement of said coil along the surface of said first frame.

5. The method according to claim 4, wherein said coil has a hollow portion in a center of a winding of said coil, and said protrusion is fitted into said hollow portion.

6. The method according to claim 1, wherein an opening portion into which said liquid resin is poured in said third step is inwardly expanded so that a flow path of said liquid resin is inwardly expanded.

7. The method according to claim 1, further comprising a step of providing a molded portion for staying and molding said liquid resin, said molded portion being provided outside an opening portion into which said liquid resin is poured, said opening portion being formed by said first frame and said second frame.

8. The method according to claim 1, wherein said first resin and said second resin are made of insulative resin.

9. The method according to claim 1, wherein said second step includes a step of joining said second frame to said first frame.

10. The method according to claim 1, wherein both or one of said first and said second frame has a positioning portion for positioning a metal mold.

11. The method according to claim 1, wherein said coil is wound to form the coil forming surface of said coil along the surface of said heat generating member.

12. The method according to claim 1, wherein said coil has an extended portion proximate to said heat generating member and extending along a rotation axis of said heat generating member, wherein said extended portion forms a surface along the surface of said heat generating member.

13. The method according to claim 1, wherein said first frame and said second frame are disposed opposite to each other through said coil forming surface to support the both surfaces of said coil forming surface.

14. A method of manufacturing a heating apparatus for heating a material to be heated by heat of a heat generating member that generates the heat by a magnetic flux from a coil, said method comprising:

a first step of disposing one surface of a coil forming surface on a first frame, said coil having said coil forming surface formed by an arrangement of a coil wire;

a second step of disposing a second frame on an other surface of said coil forming surface, wherein a movement of said coil forming surface between said first frame and said second frame is substantially restricted by said second step;

a third step of pouring liquid resin between said first frame and said second frame after said second step;

a fourth step of curing the liquid resin to fix said coil between said first frame and said second frame after said third step; and a fifth step of disposing said fixed first and second frames opposite to said heat generating member.

* * * * *

UNITED STATES PATENT AND TRADEMARK OFFICE
CERTIFICATE OF CORRECTION

PATENT NO. : 6,961,991 B2  
APPLICATION NO. : 10/150152  
DATED : November 8, 2005  
INVENTOR(S) : Atsushi Fuseya et al.

It is certified that error appears in the above-identified patent and that said Letters Patent is hereby corrected as shown below:

TITLE PAGE AT ITEM [56] RC:
Foreign Patent Documents, "61222210" should read --61-222210--.

COLUMN 1:
Line 48, "until" should read --from the--.
Line 49, "at the starting of the device," should be deleted.

COLUMN 5:
Line 7, "gage)" should read --gate--.

COLUMN 10:
Line 49, "once" should read --first--.
Line 50, "flows" should read --then flows--.

COLUMN 16:
Line 27, "an other" should read --another--.

COLUMN 18:
Line 5, "an other" should read --another--.

Signed and Sealed this

Thirtieth Day of September, 2008

JON W. DUDAS  
*Director of the United States Patent and Trademark Office*